United States Patent
Schröppel

(10) Patent No.: US 9,879,656 B2
(45) Date of Patent: Jan. 30, 2018

(54) ROLLER BEARING ARRANGEMENT FOR MOUNTING PARTS OF A WIND POWER PLANT AND A WIND POWER PLANT HAVING A BLADE BEARING DESIGNED IN SUCH A MANNER

(71) Applicant: IMO Holding GmbH, Gremsdorf (DE)

(72) Inventor: Werner Schröppel, Wendelstein (DE)

(73) Assignee: IMO Holding GmbH, Gremsdorf (DE)

( * ) Notice: Subject to any disclaimer, the term of this patent is extended or adjusted under 35 U.S.C. 154(b) by 581 days.

(21) Appl. No.: 14/377,242

(22) PCT Filed: Sep. 17, 2012

(86) PCT No.: PCT/EP2012/003875
§ 371 (c)(1),
(2) Date: Nov. 26, 2014

(87) PCT Pub. No.: WO2013/117203
PCT Pub. Date: Aug. 15, 2013

(65) Prior Publication Data
US 2015/0139809 A1   May 21, 2015

(30) Foreign Application Priority Data

Feb. 7, 2012 (DE) .................. 10 2012 002 203

(51) Int. Cl.
*F03D 11/00* (2006.01)
*F03D 1/06* (2006.01)
(Continued)

(52) U.S. Cl.
CPC ........ *F03D 11/0008* (2013.01); *F03D 1/0658* (2013.01); *F03D 7/0224* (2013.01);
(Continued)

(58) Field of Classification Search
CPC ...... F16C 19/49; F16C 19/492; F16C 19/495; F16C 19/54; F16C 19/545; F16C 19/547;
(Continued)

(56) References Cited

U.S. PATENT DOCUMENTS

2010/0067838 A1*  3/2010  Frank ............... F16C 19/18
                                                         384/477

FOREIGN PATENT DOCUMENTS

DE     10 2008 049 812 A1     4/2010
DE     10 2008 049 814 A1     4/2010
(Continued)

*Primary Examiner* — Phillip A Johnson
(74) *Attorney, Agent, or Firm* — Pandiscio & Pandiscio

(57) ABSTRACT

The invention relates to a rolling bearing arrangement (5) for mounting parts of a wind power plant (1), comprising three relatively rotatable annular elements (6-8) arranged concentrically with one another and at least regionally inside one another for connection to relatively rotatable parts of the wind power plant, wherein two relatively rotatable connecting elements (6-9) are separated from each other by a gap (9, 10) and partially or wholly overlap each other in the radial direction, wherein, further, provided in the region of a gap in radially overlapping regions of the annular connecting elements are at least two rows of rolling elements (34, 35), each of which rolls along a respective two raceways (32, 33) that overlap each other at least regionally in the radial direction, as well as at least one additional row of rolling elements (42) whose raceways do not overlap in the radial direction, wherein the radially innermost connecting element and the radially outermost connecting element are connected to one machine part and the radially middle connecting element is connected to the respectively other machine part.

24 Claims, 6 Drawing Sheets

(51) Int. Cl.

| | |
|---|---|
| *F16C 19/49* | (2006.01) |
| *F16C 33/58* | (2006.01) |
| *F16C 19/50* | (2006.01) |
| *F03D 7/02* | (2006.01) |
| *F16C 19/08* | (2006.01) |
| *F16C 19/28* | (2006.01) |
| *F16C 35/04* | (2006.01) |
| *F16C 35/06* | (2006.01) |
| *F03D 80/70* | (2016.01) |

(52) U.S. Cl.
CPC ............. *F03D 80/70* (2016.05); *F16C 19/08* (2013.01); *F16C 19/28* (2013.01); *F16C 19/492* (2013.01); *F16C 19/50* (2013.01); *F16C 33/581* (2013.01); *F16C 35/04* (2013.01); *F16C 35/06* (2013.01); *F05B 2240/54* (2013.01); *F16C 2300/14* (2013.01); *F16C 2360/31* (2013.01); *Y02E 10/721* (2013.01); *Y02E 10/722* (2013.01)

(58) Field of Classification Search
CPC .. F16C 2300/14; F16C 2360/31; F03D 80/70; F05B 2240/54
See application file for complete search history.

(56) References Cited

FOREIGN PATENT DOCUMENTS

| | | | | |
|---|---|---|---|---|
| DE | 102008049814 | * | 4/2010 | ........... F03D 7/0204 |
| EP | 1741940 A1 | * | 1/2007 | .............. F16C 19/38 |
| WO | WO 2007/006301 A1 | | 1/2007 | |
| WO | WO 2008/052778 A1 | | 5/2008 | |
| WO | WO 2008/092447 A1 | | 8/2008 | |
| WO | WO 2010037371 A1 | * | 4/2010 | ........... F16C 19/381 |

* cited by examiner

ROLLER BEARING ARRANGEMENT FOR MOUNTING PARTS OF A WIND POWER PLANT AND A WIND POWER PLANT HAVING A BLADE BEARING DESIGNED IN SUCH A MANNER

The invention is directed, on the one hand, to a rolling bearing arrangement, preferably a large rolling bearing with a diameter of 0.5 m or more, for mounting parts of a wind power plant, particularly as a blade bearing of a wind power plant, comprising at least two relatively rotatable annular connecting elements arranged concentrically with one another and at least regionally inside one another for connection to relatively rotatable parts of the wind power plant, wherein two relatively rotatable connecting elements are separated from each other by a gap and wholly or partially overlap each other in the radial direction, wherein, further, provided in the region of a gap in radially overlapping regions of the annular connecting elements are at least two rows of rolling elements, each of which rolls along a respective two raceways that overlap each other at least regionally in the radial direction, as well as at least one additional row of rolling elements whose raceways do not overlap in the radial direction; and, on the other hand, to a rolling bearing arrangement of this kind as a blade bearing of a wind power plant having a wind wheel that rotates about an axis that is approximately parallel to the direction of the wind, wherein one or preferably a plurality of elongated rotor blades are arranged projecting approximately radially from the hub and such that each can be rotated about its longitudinal axis by means of a respective blade bearing.

Large rolling bearings with a diameter of 0.5 m or more for mounting rotor blades to the hub of the wind wheel of a wind power plant are subjected to extreme mechanical loads.

Even under a steady wind load, wind pressure generates not only radial force, but also very high tilting moments, since the root of the rotor blade, in contrast to its tip, is unable to yield before the wind pressure and thus acts as a fulcrum. Whereas the rotor blade, when driven by the hub motor, is able to evade the moment components oriented tangentially to the periphery of the hub, it is unable to evade the moment components parallel to the rotor axis. The rotor bearing constantly has to transmit this substantial load to the hub without giving way.

Added to this is the load resulting from the weight force of the rotor blade. This varies during each rotation of a rotor blade about the hub: When the rotor blade is vertical, its weight load directed toward the rotation axis of the blade bearing takes the form of a largely harmless axial tension or compression force. When the rotor blade is in a horizontal position, however, a combination of radial force and tilting moment occurs, with the latter representing the greater load for the rolling bearing. The variable load associated with the constantly changing direction of the forces and moments is especially difficult to control.

To this are added other substantial variable loads, for example due to different wind velocities at different heights, which a rotor blade is always exposed to as it moves through its circular path, with the result that, among other things, the drive torque is not constant, but instead fluctuates continually.

It should be kept in mind in this connection that quite often the wind flow is not uniform, but gusty, with a wind direction and strength that vary constantly and unpredictably and cannot be corrected for by any adjustment scheme, no matter how good, since there is no computer model for them.

Lastly, it may be noted that a rotor blade is exposed to all types of weather for years on end, and thus cannot avoid storms or even hurricanes, even if it is taken out of the wind insofar as possible.

Obviously, therefore, rotor bearings have to work wonders to stabilize the rotor blade for many years in the face of all these adversities.

For this reason, it has been proposed, for example in WO 2008/052778 A1, to use multi-row ball bearings as blade bearings, up to six rows of balls being used in order to gain adequate stability. To absorb tilting moments, rows of especially strong axial bearings are used; up to five rows of these are provided, with preferably only one row of radially acting balls. The prior invention provides for arranging up to three rows of axial ball bearings in a common plane, as it were coaxially inside one another. It was found, however, that with such a large number of rows of rolling elements, not only is the assembly of the bearing very complicated, but problems also arise in connecting the individual bearing rings to the rotor blade, on the one side, and the hub of the wind wheel, on the other. This is because the raceways for three concentrically arranged rows of rolling elements take up the entire width of a rolling bearing ring and extend along its entire end side next to or concentrically inside one another. As a result, it is impossible either to use this end side as a connecting surface or to dispose any kind of fastening means on it. To circumvent this difficulty, the opposite end side is designed as a connecting surface and is provided with coronally distributed, internally threaded blind bores for receiving threaded screws. However, this method of attachment is not always suitable for modern rotor blades and/or hubs of wind wheels, especially when the latter themselves are provided only with internally threaded blind bores for receiving threaded screws.

From the disadvantages of the described prior art comes the problem initiating the invention, to further develop a rolling bearing arrangement of the above species and a wind power plant equipped therewith in such fashion that despite high or maximal stability, particularly against tilting moments and/or variable loads, no limitations need be accepted with regard to connection to the particular machine or system components, particularly to a rotor blade of a wind wheel, on the one side, and the hub of a wind power plant, on the other.

This problem is solved by the fact that a rolling bearing arrangement of the above species has a total of at least three relatively rotatable annular connecting elements, each having a flat connecting surface for effecting connection to a total of two different machine or system parts, wherein the three annular connecting elements are arranged radially inside one another and the radially innermost connecting element and the radial outermost connecting element are connected to one machine part or system part and the radially middle connecting element is connected to the respectively other machine part or system part.

Hence, according to the invention the middle connecting element is embraced by the other two on only two sides, that is, on its radially inner and radially outer sides. Whereas in WO 2008/052778 A1 an annular connecting element is embraced on as many as three sides, according to the invention the middle connecting element is indeed flanked on its inner and outer sides by a respective additional connecting element on each side, but these do not block access to the two end sides of the middle connecting element; in particular, neither of the two end sides of the middle connecting element serves as a raceway for rows of rolling elements of any kind. Instead, it becomes possible to use an end side of the middle ring as a connecting surface and optionally to dispose through-bores in it for attachment to a machine part or system part, thus also permitting attachment by means of screws inserted through the bores and screwed into the connected structure. The bottom sides of the screw heads then have sufficient space to rest against the opposite end side from the connecting surface and thereby press the connecting element tightly against the connected structure. An additional advantage that must not be underestimated is that, strictly speaking, two mutually concentric bearings are actually present, which makes it possible for example to disassemble a ring and/or replace the rolling elements of such a bearing subassembly while the respectively other bearing subassembly temporarily assumes the task of stabilizing the rotor blade by itself.

It has proven advantageous to provide, in the region of each of the two gaps in the radially overlapping regions of the annular connecting elements, at least two respective rows of rolling elements, each of which rolls along a respective two raceways that overlap one another at least regionally in the radial direction. Because the bearing raceways themselves are disposed in the radially overlapping regions of the particular connecting elements, they are able to transmit partially or predominantly axial forces. This is especially important in the case of large bearings for electric power plants, particularly for the rotor blades of wind power plants, so that the more intense tilting moments that occur in that case can be absorbed and controlled. One of the two rows of rolling bearings in a gap absorbs axial compression forces and the other absorbs axial tension forces. Due to the dual arrangement of these two rows, that is, with at least two such rows in each gap, the axial forces that occur are conveyed by the middle ring uniformly to its radial inner side and its radial outer side, so there is no risk of, for example, elliptical deformation of the middle ring. Nor is there any risk of deformation of the two outer rings, since only half the axial forces occur in each one. The rolling elements themselves are also protected, since there are at least twice as many of them as in conventional bearing designs.

In a preferred realization of the invention, the middle connecting element is divided in the axial direction into at least three sections: a first section, disposed adjacent its connecting surface; a second section, adjacent its opposite end side; and, between them, a third section that projects or recedes to an equal extent in the radial direction relative to the first two. Formed at the transitions between the first and third sections and between the second and third sections are steps whose overhanging regions are configured as raceways. Because the third, i.e. middle, section either extends toward or retreats from the center of the middle ring in the radial direction compared to the other two sections, at least two steps of this kind are formed per gap.

If two radially converging, step-shaped offsets per gap are provided, i.e., between a middle section and two outer sections—an upper one and a lower one—the middle section then takes either the form of a circumferential nose or flange or the form of a circumferential groove or depression. A respective raceway of the middle connecting element is located on the flanks of each of these elements. These two raceways thus either face each other, i.e. in the case of a circumferential groove or depression, or face away from each other, i.e. in the case of a circumferential nose or protrusion. Regardless, these two raceways assigned to the same gap and forming part of the middle connecting element point in opposite axial directions, and the rolling elements rolling on them can therefore transmit axial forces in different axial directions.

The rolling elements rolling along two raceways that overlap each other at least regionally in the radial direction are preferably shaped as balls. Spherical rolling elements can assume any arbitrary contact angle between 0° and 90°, depending on the arrangement of the raceways, and thus can simultaneously transmit radial forces as well as axial forces. With an arrangement of this kind, therefore, there is no need for a radial row, or such a row can be dimensioned as much smaller.

A preferred further development of the invention provides for a total of at least four rows of spherical rolling elements, each rolling between a respective two raceways that overlap each other at least regionally in the radial direction. As pointed out above, such an arrangement is obtained if there are two rolling-element rows per gap and the rows are mutually offset in the radial direction, the two gaps being mutually offset in the radial direction.

It is within the scope of the invention that the center points of the spherical rolling elements of the four rows of balls move along four circular paths around the axis of rotation of the rolling bearing, and the points at which these paths are intersected by a transverse plane of the rolling bearing radially to its axis of rotation lie at the corners of a quadrangle, preferably at the corners of a rectangle or a square. In other words, within a radial sectional plane taken along the axis of rotation of the bearing and containing the great circle of a spherical rolling element in each row of balls, the imaginary direct connecting lines between the center points of the spherical rolling elements performing axial force transmission form a preferably right-angled quadrangle, particularly a rectangle or a square. The previously described axial offset of the rows of rolling elements in each gap and the radial offset between the two gaps causes the rolling elements to be arranged in this way, in a quadrangle of the cross section of the rolling bearing or along the edges of a virtual four-edged bar that is bent into a circle around the axis of rotation of the bearing. If this virtual four-edged bar bent into an annular shape has right-angled edges, the rows of rolling elements are disposed symmetrically to one another and the forces that occur are therefore symmetrically distributed in each case, with the result that under exclusively axial loads—axial forces and/or tilting moments—the middle ring does not undergo any radial bending, i.e., reacts extremely rigidly.

A preferred embodiment of the invention is further characterized in that the connecting line between two diametrically opposite corners of the quadrangle formed by the circular paths of the center points passes through all of the particular raceway cross sections either in or near the center of the fitted region of each raceway, or in that the respective connecting line between the centers of the fitted regions of the two raceway cross sections associated with each two rows of balls intersects a row of balls approximately perpendicularly. Whereas, in the first case, in the presence of combined axial and radial forces, the forces transmitted by the four rows of rolling elements involved are directed toward or away from a common center in the manner of an X shape, the force lines of the forces to be transmitted in the second case run approximately tangentially to the center of the ring cross section, like the sides of a rhombus or of a square standing on one vertex. Of course, in the first case the middle ring is loaded cross-sectionally in compression and can be "clamped," so to speak, between the two outer rings, and torsional forces are opposed to a lesser degree, whereas in the latter case the situation is exactly reversed; nevertheless, in both cases, each of the four potential compression force directions points in four different directions, depending on the direction of origin, into the four quadrants of a Cartesian coordinate system. Thus, all conceivable load cases can be handled by a bearing according to the invention.

If the connecting line between the centers of the fitted regions of both raceway cross sections of a row of balls either coincides with the connecting line between the circular paths of the center points of the particular row of balls, on the one hand, and the row of balls disposed diametrically opposite thereto in the quadrangle formed by the circular paths of the center points, on the other hand, or if it intersects therewith at the center of the first row of balls, then a ball is surrounded symmetrically to its particular contact points by the fitted regions of its two raceways and is therefore optimally guided thereby. In particular, contact with the edges of the raceways that would potentially be damaging to the balls can be avoided in this way.

The invention further provides that the raceway cross sections of a row of balls are mirror-symmetrical, with respect to a main plane of the rolling bearing, to the raceway cross sections of an axially offset row of balls. This results, on the one hand, in a maximal degree of symmetry; on the other hand, with an arrangement of this kind the transmissible axial tension and compression forces are approximately equal, and the dimensioning can therefore be based on a single maximum value, regardless of its direction of action.

In addition, the raceway cross sections of a row of balls should be mirror-symmetrical, with respect to a center axis extending parallel to the axis of rotation of the bearing and located in the cross-sectional plane, to the raceway cross sections of a radially offset row of balls. In such a case, the transmissible radial forces are also approximately equal irrespective of direction, regardless of whether said directions are inward or outward.

If, in addition, the raceway cross sections of a row of balls of a point in the cross-sectional plane are point-symmetric to the raceway cross sections of a diagonally—i.e., axially and radially—offset row of balls, then the behavior of the middle connecting element in response to tilting moments is ideally calibrated, and any tendency to yield on one side is suppressed to the greatest possible extent.

The invention can be developed further in that the contact angle of the spherical rolling elements rolling between a respective two raceways that overlap each other at least regionally in the radial direction is 45° or more, preferably 50° or more, particularly 60° or more. This means that these rows of rolling elements are designed to be loaded primarily with axial forces and/or tilting moments. This represents the most prevalent loading case, particularly in the mounting of rotor blades to the hub of a wind power plant.

The invention can be developed further by disposing in one of the two gaps at least one row of rolling elements whose contact angle is less than 45°, for example equal to or less than 40°, preferably equal to or less than 30°, particularly approximately 0°. At least one such row of rolling elements primarily assumes the function of additional centering, where appropriate, of the middle connecting element in the radial direction. Since the load in this direction is usually much smaller than an axial load in the case of the mounting of rotor blades to the hub of a wind power plant, these rolling elements can be implemented as smaller than the previously described rolling elements, which are clamped primarily in the axial direction. At least one sliding bearing or any other type of bearing can optionally be used here instead of a rolling bearing. By the same token, such radial bearings can also, of course, be provided in both gaps.

It has proven effective for the rolling elements to roll with a contact angle of less than 45° between two raceways disposed radially beyond the radially overlapping region of the particular connecting elements. Within a common cross-sectional plane, the center points of the rolling elements in the three rows of rolling elements lie at the corners of a preferably equilateral triangle, the apex of the triangle corresponding to the radial row of balls and the vertices on both sides of the base each corresponding to a respective axial row of balls. An extreme degree of symmetry is obtained in this way, and the inventive bearing is therefore easy to calculate and dimension.

The rolling elements with a contact angle of less than 45° can be configured as roller-shaped, with a longitudinal axis oriented parallel to the axis of rotation of the bearing. In such cases, even relatively small rolling elements are sufficient to absorb the limited radial loads that occur. The design size of the rolling bearing according to the invention can thus be reduced to a minimum, at least in the axial direction.

According to the invention, in the middle connecting element and/or in one or both of the respectively other connecting elements there can be provided respective coronally distributed fastening elements, for example fastening bores, preferably through-bores whose longitudinal axis is parallel to the axis of rotation, particularly having no internal thread. Such through-bores, in particular, can be used to effect locking by means of screws that engage through them and are screwed into the particular connected structure—for example the rotor blade or hub—and are anchored thereby.

The invention can be developed further in that the middle connecting element and/or one or both of the respectively other connecting elements is/are divided along a main plane of the bearing. This facilitates mounting to/with a nose ring that is gripped on both flanks of its circumferential nose.

It has proven effective for one or both bearing gaps to be sealed at at least one mouth region. At least one outwardly disposed mouth between the radially outer connecting element and the middle connecting element should be sealed to protect the gap behind it from the effects of weather; granted, the neighboring gap mouth beyond the connecting surface of the middle connecting element is inside the arrangement, it is still exposed to the internal space of the rotor blade. This mouth region should also be sealed against the possibility that greater moisture should accumulate in that space. Finally, the other two gap mouths are located inside the hub body, but here again, it is possible for moisture to get in, so sealing is advisable here as well.

A preferred design rule provides that devices for introducing a lubricant, for example lubricating nipples, are provided in the innermost or the outermost connecting element, or preferably in the innermost and the outermost connecting element. The lubricant used is preferably grease; the use of lubricating oil is also conceivable in principle, although this calls for a substantial increase in expenditure for the seals to keep the liquid lubricant from leaking out.

Further advantages are obtained by disposing the lubricating devices, particularly lubricating nipples, at the respective heights of the rows of rolling elements. This is the primary field of action of the lubricant, so the latter should be fed in particularly at these locations when being replenished.

A wind power plant according to the invention, comprising a wind wheel rotating about an axis that is approximately parallel to the direction of the wind, wherein one or preferably a plurality of elongated rotor blades are arranged projecting approximately radially from the hub of the rotor and such that each can be rotated about its longitudinal axis by means of a respective blade bearing, wherein one or more or all of the blade bearings are configured as a rolling bearing arrangement, preferably as a large rolling bearing with a diameter of 0.5 m or more, comprising at least two relatively rotatable annular elements arranged concentrically with one another and at least regionally inside one another for connection to relatively rotatable parts of the wind power plant, wherein two relatively rotatable connecting elements are separated from each other by a gap and wholly or partially overlap each other in the radial direction, wherein, further, provided in the region of a gap in radially overlapping regions of the annular connecting elements are at least two rows of rolling elements, each of which rolls along a respective two raceways that overlap at least regionally in the radial direction, is characterized in that at least one blade bearing comprises at least three relatively rotatable annular connecting elements, each of which has a flat connecting surface for connection to the hub and to the rotor blade, wherein the three annular connecting elements are arranged radially inside one another and the radially middle connecting element is connected to the hub or the rotor blade, whereas the radially innermost connecting element and the radially outermost connecting element are connected to the respectively other element. The wind wheel of such a wind power plant is imparted higher stability by the inventive mounting of the rotor blades, which also has a positive effect on, among other things, the achievable service life.

The blade bearing of such a wind power plant can have one or more of the previously described features of a rolling bearing. The advantages of a rotor blade bearing provided with the above-described features not only translate to the wind wheel, but also thereby improve the overall characteristics of a wind power plant of this kind.

According to the invention, a connecting region that is approximately fork-shaped in cross section can be provided on the hub or the rotor blade, comprising two aprons arranged concentrically one inside the other, for connection to the radially innermost and the radially outermost connecting element of the blade bearing. The radially innermost connecting element, on the one side, and the radially outermost connecting element, on the other side, can then be connected to the preferably mutually flush, free end sides of these two aprons; the distance between the two aprons then is approximately equal to the width of the middle connecting element.

The fastening screws, fastening bolts or similar fastening means can be accessible through inspection bores in the fork-shaped connecting region. The rotor blade can thus be anchored to the rotor blade bearing after the latter is fastened to the rotor hub. Any desired subsequent disassembly in the region of each connected structure is also possible without the need to detach the respectively other connected structure.

Finally, it is within the teaching of the invention that the distance between the two aprons of the cross-sectionally fork-shaped region is approximately equal to the preferably smallest diameter of the head of a fastening screw, fastening nut or the like and thereby protects this fastening means against accidental detachment. In this way, a polygonal fastening means, preferably one shaped as a hexagon, is held non-rotatably in place as if by means of an open-jaw wrench and thus cannot become detached, even when subjected to heavy vibrations. It is advantageous in this case if a cross section through the particular fastening means includes two mutually opposite and parallel sides on the outer periphery of its non-externally-threaded region, particularly its head. This is true of, for example, a regular polygon having an even number of sides.

Further features, details, advantages and effects based on the invention will emerge from the following description of some preferred embodiments of the invention and by reference to the drawing. Therein:

Figure 1:
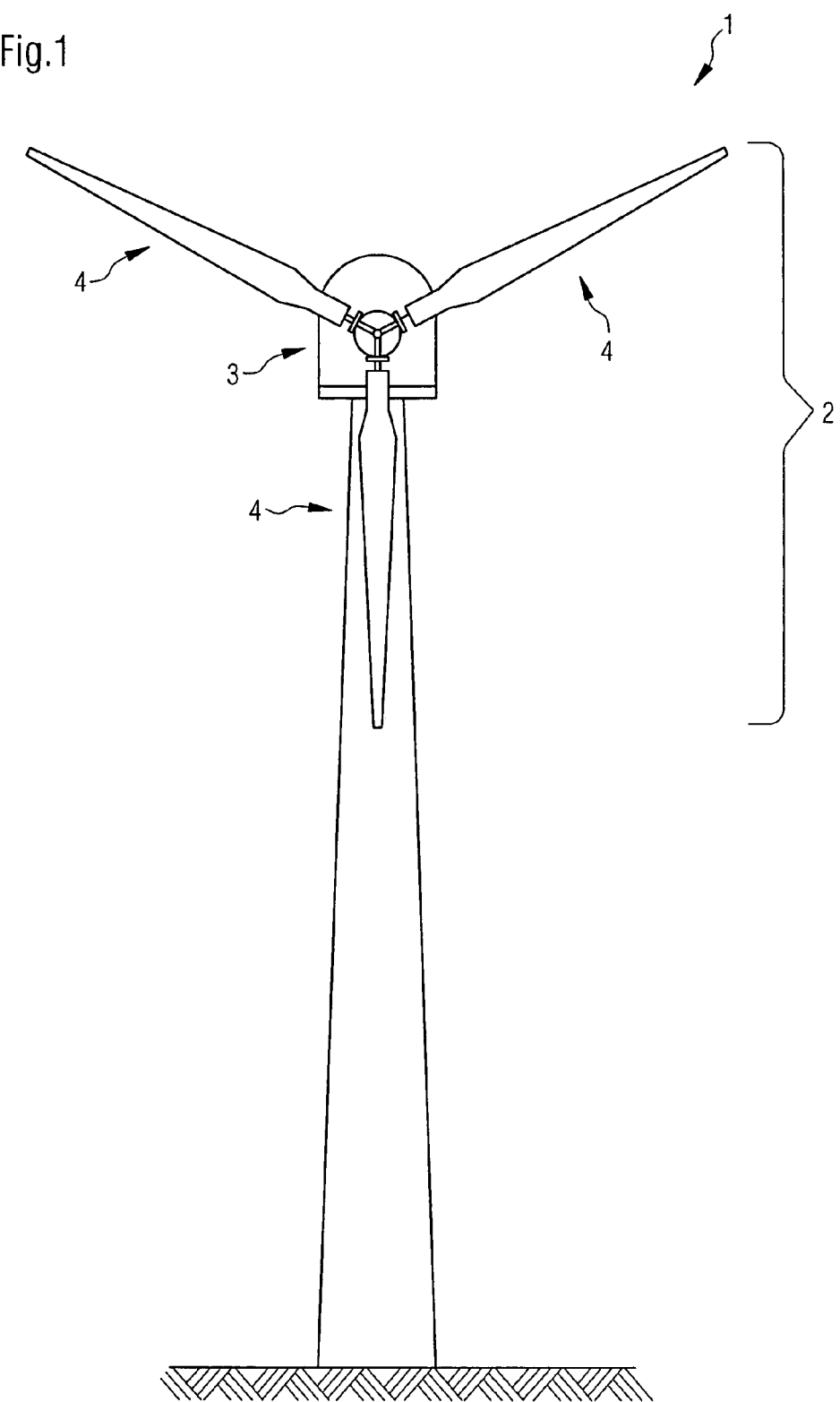
FIG. 1 shows a wind power plant according to the invention in front elevation.

FIG. 1 shows, in a somewhat schematic view, a wind power plant 1 with a tower, a nacelle and a wind wheel 2 having a hub 3 that rotates about the so-called rotor axis or main axis, together with a plurality of elongated rotor blades 4 projecting from the hub 3 approximately radially to the rotor axis or main axis.

The rotor axis or main axis is preferably oriented approximately in the direction of the wind flow, this being done by readjusting the rotor axis or main axis by rotating the nacelle about the vertical axis of the tower of the wind power plant.

To keep the rotation speed of the wind wheel as constant as possible despite different wind strengths, or at least to keep it within a defined speed range, the rotor blades 4 can be rotated about their respective longitudinal axes and thus be pitched more into the wind or taken out of the wind, as needed. This function is performed by so-called blade bearings 5, each of which connects a respective rotor blade 4 to the hub 3.

For active control of the pitch of the rotor blades, a circumferential ring gear, for example with a motor-driven pinion meshing with it, can be provided in the vicinity of a blade bearing 5 of this kind.

Figure 2:
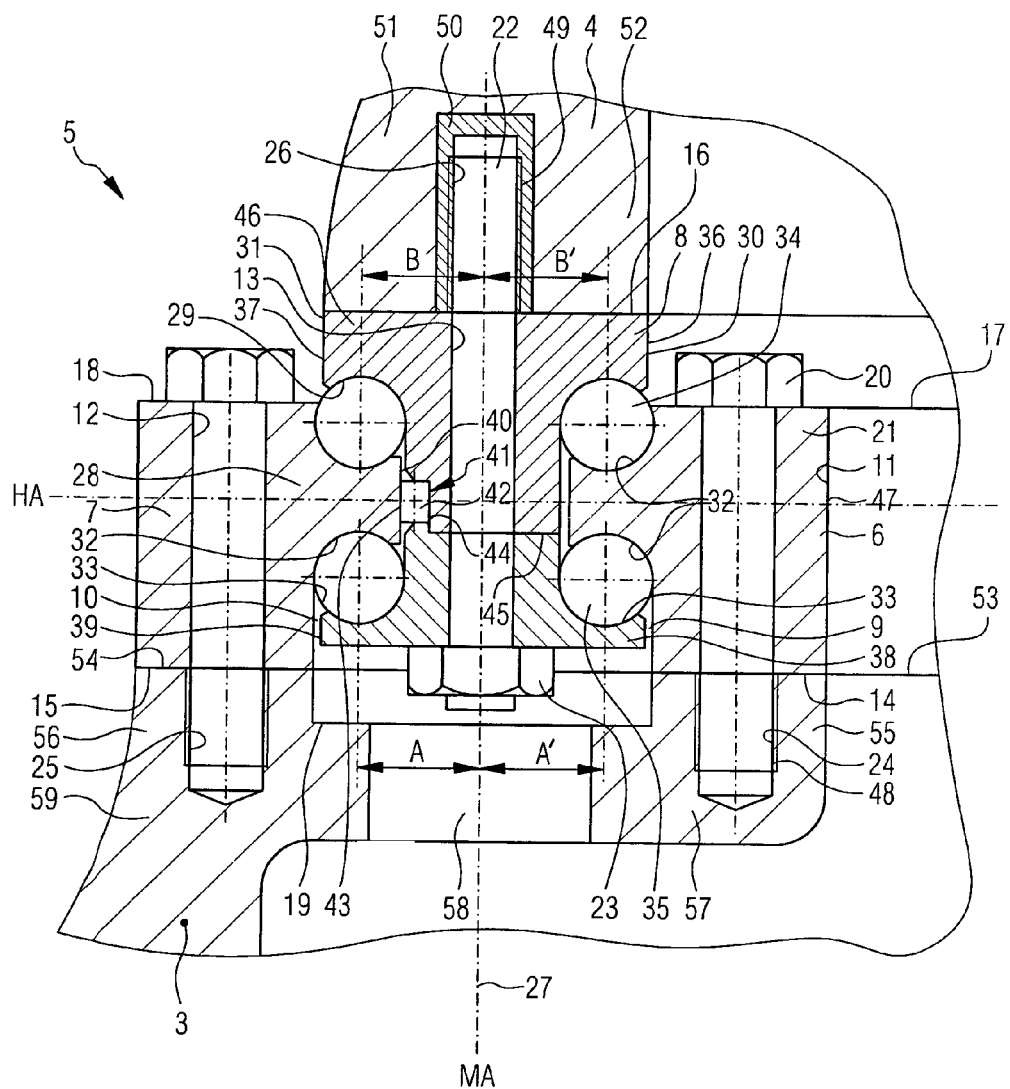
FIG. 2 is a cross section through a first embodiment of a rolling bearing according to the invention, installed between the hub and a rotor blade of the wind power plant according to FIG. 1, partially broken away.

FIG. 2 shows a broken-away cross section through a blade bearing 5, including the regions of the hub 3 and the rotor blade 4 that are connected to the bearing. Whereas in this case the rotor axis or main axis extends approximately horizontally under the illustrated detail, the axis of rotation of the blade bearing 5—and thus the roughly coaxial longitudinal axis of the rotor blade 4—is located to the right, past the margin of the illustrated detail, and extends there from top to bottom, i.e., radially and perpendicularly to the rotor axis or main axis. Whereas the region of the blade bearing 5 that is excerpted in FIG. 2 has a width on the order of approximately between 10 cm and 30 cm, the diameter of the blade bearing 5 in a large wind power plant is typically approximately between 0.5 m and 10 m, preferably between 1 m and 8 m, particularly between 2 m and 5 m, and is therefore well outside the area that can be depicted on the drawing sheet. Because of its large size, a blade bearing 5 is also commonly referred to as a large rolling bearing.

The blade bearing 5 has a total of three annular connecting elements whose ring axes all extend coaxially with the axis of the rotor blade: Between a radially inner connecting element 6 and a radially outer connecting element 7, there is a middle connecting element 8. Since the respectively adjacent connecting elements—i.e., the radially inner connecting element 6 and the middle connecting element 8, on the one side, and the middle connecting element 8 and the radially outer connecting element 7, on the other side—are separated from each other in each case by a respective gap 9, 10, in the uninstalled state all three connecting elements 6-8 can be rotated at will relative to one another.

This is no longer the case in the installed state, however. As can be seen from FIG. 2, the radially inner connecting element 6 and the radially outermost connecting element 7 are fastened to the same connected structure, specifically, in the illustrated example, to the hub 3 of the wind wheel 2. In the installed state, therefore, these two connecting elements 6, 7 are no longer able to rotate relative to each other, but can rotate only relative to the respective middle connecting element 8, which is connected to the rotor blade 4.

The function of securing the individual connecting elements 6-8 is performed by bores 11-13 distributed coronally over the particular ring and extending parallel to the axis of rotation of the blade bearing 5. These each open at a connecting surface 14-16 of the particular connecting element 6-8, against which a flat surface region in the vicinity of the jacket of the hub 3 or at the back end of the rotor blade 4 rests flushly or areally.

Since the illustrated example comprises through-bores 11-13, preferably with no internal thread, these also open at the respectively opposite end face 17-19 of the particular connecting element 6-8. There, the heads 20 of screws 21 inserted through these openings 11-13, or nuts 23 threaded onto bolts 22 inserted through them, or similar threaded elements, have sufficient space for abutment. If these screws 21 or (stud or threaded) bolts 22 are screwed into bores 24-26 of the hub 3 or of the rotor blade 4 that are aligned with the respective bores 11-13 and they or nuts 23 threaded onto them are tightened, the particular connecting surfaces 14-16 are pressed friction-lockingly against the adjacent surface of the hub 3 or of the rotor blade 4.

The bore 13 in the middle connecting element 8 is located approximately midway between the two gaps 9, 10. As can further be appreciated from FIG. 1, the depicted cross section of the blade bearing 5 overall is substantially symmetrical to the longitudinal axis 27 of the bore 13, which consequently will also be referred to as the center axis CA. All the spherical rolling elements 34 for transmitting axial forces are the same radial distance from this center axis CA.

The internal structure of the blade bearing 5 has still another symmetry, however, specifically with respect to a horizontal main plane MP, which is intersected perpendicularly by the longitudinal axis 27 of the bore 13 and by the center axis CA and is also indicated in FIG. 2. All spherical rolling elements 34 for transmitting axial forces are the same axial distance from this main plane MP.

Because of the Dual Symmetry of the Rolling Elements 34, their Center Points, in the Cross-Sectional Representation of FIG. 2, Lie at the Corners of an Imaginary Rectangle or Even a Square.

In the embodiment according to FIG. 2, the radially innermost ring 6 and the radially outermost ring 7 are each configured as nose rings, each having a flange, referred to in technical jargon as a nose 28, that projects toward the particular gap 9, 10 or toward the middle connecting element 8. In the illustrated example, the cross sections of these two noses 28 are symmetrical to each other with respect to the axis of symmetry 27.

These two noses 28 are each embraced on three sides by the middle connecting element 8, which is provided for this purpose with a respective circumferentially extending groove 29 on each of its two curved lateral surfaces 30, 31 facing toward the gaps 9, 10. In the illustrated example, these two grooves 29 are symmetrical to each other with respect to the axis of symmetry 27.

As can further be seen from FIG. 2, the flanks of a nose 28 and those of the groove 29 embracing it overlap one another in the radial direction. The respective overlapping regions serve as raceways 32, 33, each for a respective row of rolling elements 34, 35. So that rolling elements 34, 35 can roll along each of these raceways 32, 33 without play, the maximum axial distance between two raceways 32, 33 assigned to the same rolling elements 34, 35 is equal to the diameter of those same rolling elements 34, 35. This means, on the one hand, that the maximum axial distance a between the mutually facing flanks 32 of a groove 29 is equal to the sum of the minimum axial extent e of the nose 28 plus twice the diameter d of a rolling element 34, 35: $a=e+2*d$; where the rolling elements 34, 35 are of different sizes, with diameters $d_1$, $d_2$, this becomes: $a=e+d_1+d_2$.

In the embodiment according to FIG. 2, the rolling elements 34, 35 each have a spherical shape. This means that the cross sections of the raceways 32, 33 are each concavely curved, particularly along a circular arc. These curved raceway regions should also be referred to as the fitted region, since they have nearly the same diameter as the spherical rolling elements 34, 35 and thus fit snugly against their surfaces. As can further be seen from FIG. 2, the cross section through these raceway or fitted regions 32, 33 extends in each case along a circular arc with a center angle $\alpha_1$, $\alpha_2$ of 90° or more, but less than 180°: $90° \le \alpha_1 < 180°$, $90° < \alpha_2 < 180°$, preferably: $\alpha_1 = \alpha_2 = \alpha$.

As can be seen, the flanks of a nose 28 and thus the raceways 32, 33 located there diverge toward the free end of the nose 28, specifically preferably symmetrically to each other with respect to an approximately central main plane of the blade bearing 5.

Furthermore, the flanks of a groove 29 and thus the raceways 32, 33 located there reconverge toward each other in the axial direction in the region of the edge-shaped transition from the groove 29 to the respectively adjacent curved sections 36, 37; 38, 39 of the middle connecting element 8, specifically preferably symmetrically with respect to an approximately central main plane of the blade bearing 5.

Sections 36, 38 are preferably disposed above the groove 29 and are each aligned with the respective section 37, 39 below the groove 29; consequently, end face 19 is not only parallel to but also approximately coextensive with the connecting surface 16 of the middle connecting element 8.

As can further be seen from FIG. 2, in at least one gap 9, 10—preferably in the region of the free end side 40 at least of the nose 28 located there—there is another bearing 41, particularly a fifth row of rolling elements 42. These also roll along two raceways 43, 44, which, however, are not located in radially overlapping regions of the particular connecting elements 6-8, but instead bridge the particular gap 9, 10 in the radial direction. Consequently, the axes of rotation of these rolling elements 42 are approximately parallel to the axis of rotation of the blade bearing 5, whereas the contact angles are approximately 0°, corresponding to predominantly or exclusively radial force transmission. In the embodiment shown, this bearing is a rolling bearing with cylindrical or roller-shaped rolling elements 42 that have a smaller diameter than the spherical rolling elements 34, 35. This is not mandatory, however. The diameter could instead be chosen as different, and/or instead of rollers 42, ball-, needle-, cone- or barrel-shaped rolling elements, or a sliding bearing or other type of bearing, could be used for the radial bearing 41. Moreover, at least one such radial bearing 41 can be disposed in the radially inner gap 9 or in the radially outer gap 10 or in both. For the axial guidance of roller-shaped rolling elements 42, at least one raceway 43, 44 can be configured as a groove-shaped depression in the particular connecting element 6-8.

As can further be seen from FIG. 2, the rolling-element rows 34, 35 in a common plane each have the same radial center-to-center distances A, A', B, B' from a cylinder jacket defined by the center axes 27 of the fastening bores 13: A=A'; B=B'. Particularly preferable is an arrangement in which the center points of the rolling elements 34, 35 in all four rows of rolling elements are the same radial distance from the aforesaid virtual cylinder jacket: A=A'=B=B'.

The raceways 32, 33, 43, 44 of a connecting element 6-8 are preferably formed along with the particular bores 11-13 by processing or shaping the same common base body.

Since the two noses 28 of the innermost and the outermost connecting element 6, 7 are respectively embraced on three sides by the grooves 29 of the middle connecting element 8, assembly of the blade bearing 5 is possible only if the middle connecting element 8 is divided in the region of the groove 29, along a horizontal surface 45, into an upper ring 46 and a lower ring 47, which are simultaneously slid from both axial directions over the noses 28 of the radially innermost and the radial innermost [sic] connecting element 6, 7 and only then are connected to each other, particularly screwed together.

Due to the presence of the through-bores 11-13, the bores 24-26 aligned therewith can be configured as blind bores with an internal thread 48, 49, into which the screws 21 or bolts 22 can be screwed. Depending on the nature of the material used for the hub 3 and/or the rotor blades 4, such an internal thread 48, 49 can be cut either into the particular material, such as into the hub 3 depicted in FIG. 2, or into a bushing 50 or other body which in turn is sunk into the connected structure, for example cast, glued and/or otherwise fastened therein. The radial width of the middle connecting element 8 or the radial width of its connecting surface 16 is preferably approximately equal to the radial thickness of the back end 52 of the rotor blade jacket 51, so the latter can be butted against the connecting surface 16 and fastened there.

A connected structure—in the example illustrated, the hub 3—has two concentric mounting surfaces 53, 54, each located on the free end side of a respective one of two mutually concentric aprons 55, 56. These two aprons 55, 56 are connected at their bases by a radial web 57 to form an arrangement that has, on the whole, an approximately U-shaped cross section. To gain access to the bolts 22 or the nuts 23 threaded onto them, or to screws that are used instead, the web 57 is provided with a number of access bores 58 that is equal to the number of bores 13 in the middle connecting element 8, which access bores are preferably slightly larger than the maximum diameter of the nuts 23, screw heads 20 or similar fastening means. The jacket 59 of the hub 3 sits approximately in alignment with the radially outer apron 56 against the bottom side of the web 57.

Of course, the arrangement can also be chosen to be exactly the opposite, i.e., the rotor blade 4 is provided with two mutually concentric aprons, each with a connecting surface for the innermost and the outermost connecting element 6, 7, and the hub then has only one connecting surface, for the middle connecting element 8.

Figure 3:
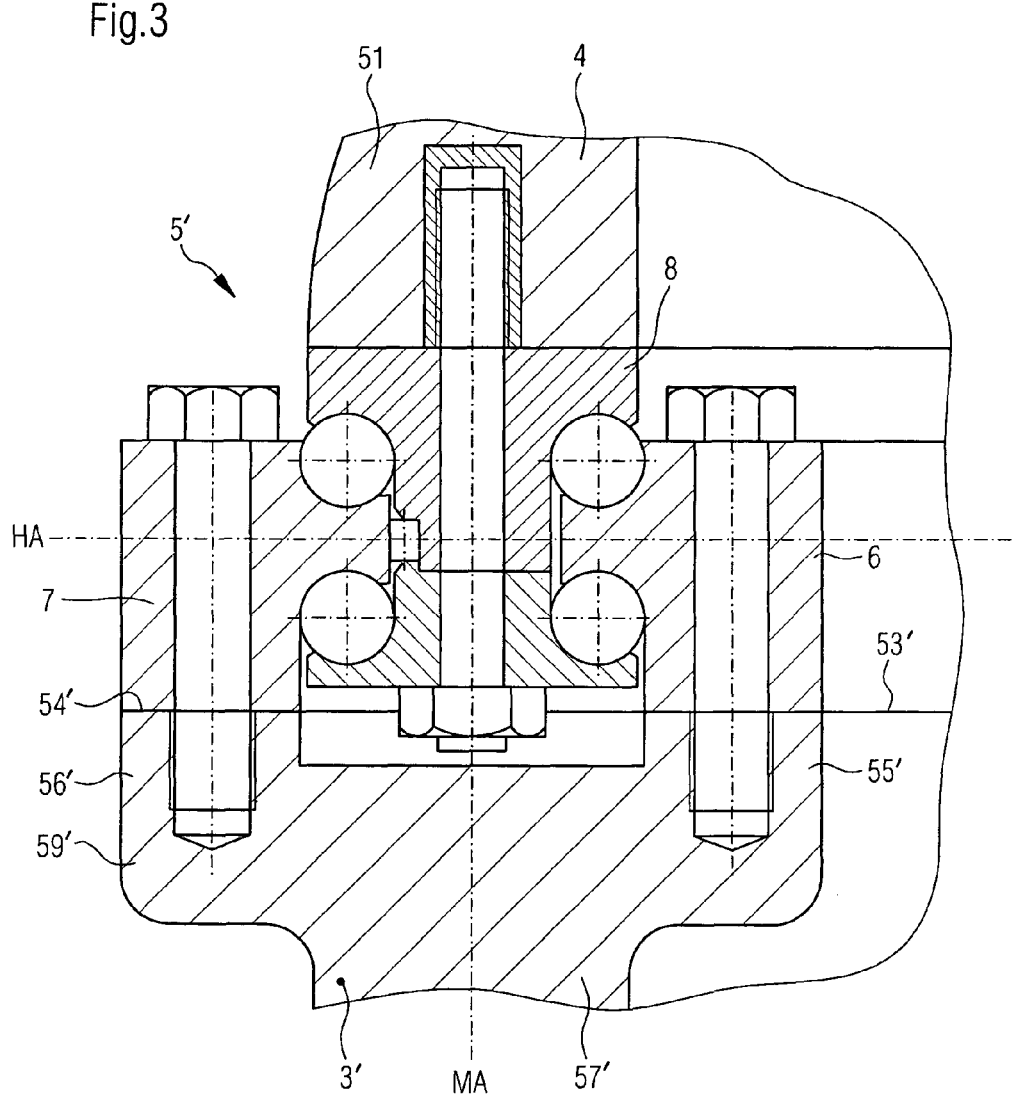
FIG. 3 is a representation corresponding to FIG. 2 of a second embodiment of the invention.

FIG. 3 shows a deviating arrangement. Here, the blade bearing 5' is nevertheless identical in design to the previously described one, and the manner of connection to the rotor blade 4 is also identical to the previously described technique; only the connected structure for connecting to the hub 3' deviates in this case:

As in the previously described embodiment, the hub 3' has in its connecting region two aprons 55', 56', which are a distance apart that is approximately equal to the maximum radial width of the middle connecting element 8. These aprons 55', 56' are also connected to each other by a web 57'. Furthermore, the hub jacket 59' sits against the bottom side of the web 57', i.e., the side facing away from the aprons 55', 56', only not in alignment with either of the two aprons 55', 56', but instead approximately exactly midway between them radially. This is possible because—among other reasons—there are no access bores 58 whatsoever in this embodiment.

The absence of access bores 58 in this embodiment makes for a special assembly sequence: The middle connecting element 8 of the blade bearing 5' is first screwed tightly to the rotor blade 4, and only then can the other two connecting elements 6, 7 be fastened to the hub 3'. Disassembly takes place in exactly the reverse order.

Figure 4:
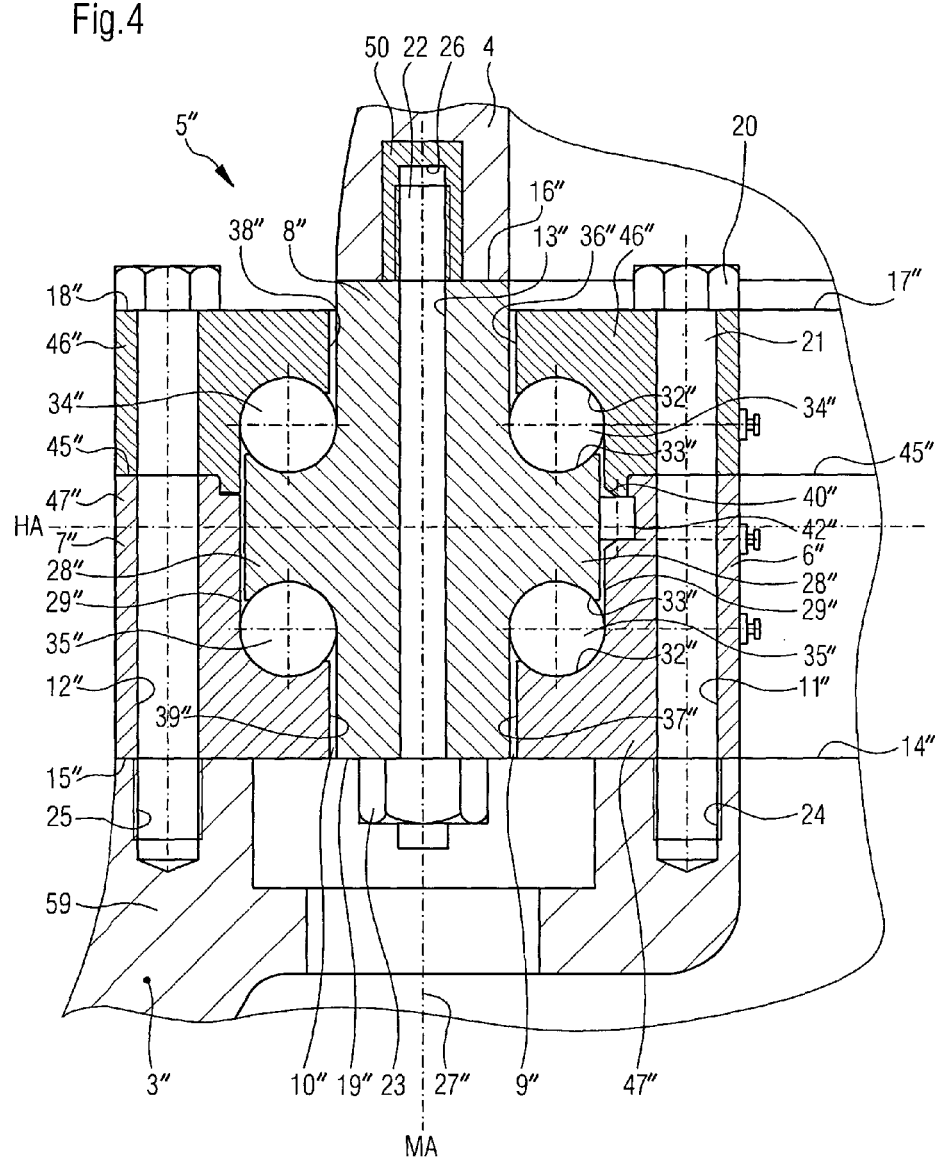
FIG. 4 is a representation corresponding to FIG. 2 of a third embodiment of the invention.

In the embodiment according to FIG. 4, both the rotor blade 4 and the hub 3 are identical in design to the corresponding elements from FIG. 2. Here, however, the blade bearing 5" itself has a different structure:

The principle of three relatively rotatable connecting elements 6"-8", each having a crown of through-bores 11"-13" separated from each other by gaps 9", 10", is preserved here.

The most consequential difference from the previously described blade bearing 5 is that here the noses 28" are not disposed on the radially innermost and the radially outermost connecting elements 6", 7", but on the middle connecting element 8", whereas the connecting elements 6", 7" that embrace each of said noses 28" on three sides each have a circumferential groove 29" on their lateral surface facing the respective gap 9", 10".

As can further be seen from FIG. 4, the flanks of a nose 28" and of the groove 29" embracing it overlap each other in the radial direction. The respective overlapping regions each serve as raceways 32", 33" for a respective row of rolling elements 34", 35". So that respective rolling elements 34", 35" can roll without play along each of these raceways 32", 33", the maximum axial distance between two raceways 32", 33" assigned to the same rolling elements 34", 35" is equal to the diameter of those same rolling elements 34", 35". This means, by the same token, that the maximum axial distance a between the mutually facing flanks 32" of a groove 29" is equal to the sum of the minimum axial extent e of the nose 28" plus twice the diameter d of a rolling element 34", 35": a=e+2*d; where the rolling elements 34", 35" are of different sizes, with diameters $d_1$, $d_2$, this becomes: a=e+$d_1$+$d_2$.

In the embodiment according to FIG. 4, the rolling elements 34", 35" each have a spherical shape. This means that the cross sections of the raceways 32", 33" are each concavely curved, particularly along a circular arc. These curved raceway regions should also be referred to as the fitted region, since they have nearly the same diameter as the spherical rolling elements 34", 35" and thus fit snugly against their surfaces. As can further be seen from FIG. 4, the cross section through these raceway or fitted regions 32", 33" extends in each case along a circular arc with a center angle $\alpha_1$, $\alpha_2$ of 90° or more, but less than 180°: 90°≤$\alpha_1$<180°, 90°≤$\alpha_2$<180°, preferably: $\alpha_1$=$\alpha_2$=$\alpha$.

As can be seen, the flanks of a nose 28" and thus the raceways 32", 33" located there diverge toward the free end of the nose 28", specifically preferably symmetrically to each other with respect to an approximately central main plane of the blade bearing 5".

Furthermore, the flanks of a groove 29" and thus the raceways 32", 33" there reconverge toward each other in the axial direction in the region of the edge-shaped transition from the groove 29" to the respectively adjacent curved sections 36", 37"; 38", 39" of the radially innermost and the radially outermost connecting element 6", 7", specifically preferably symmetrically with respect to an approximately central main plane of the blade bearing 5".

Sections 36", 38" are preferably above the groove 29" and are each aligned with the respective section 37", 39" below the particular groove 29"; consequently, the end faces 17"-19" of the connecting elements 6"-8" are not only parallel to, but also approximately coextensive with the particular connecting surface 14"-16" of the connecting element 6"-8".

As can further be seen from FIG. 4, in at least one gap 9", 10"—preferably in the region of the free end side 40" of the nose 28" there—there is another bearing 41", particularly a fifth row of rolling elements 42". These also roll along two raceways 43", 44", which, however, are not located in radially overlapping regions of the particular connecting elements 6"-8", but instead bridge the particular gap 9", 10" in the radial direction. Consequently, the axes of rotation of these rolling elements 42" are approximately parallel to the axis of rotation of the blade bearing 5", whereas the contact angles are approximately 0°, corresponding to predominantly or exclusively radial force transmission. In the embodiment shown, this bearing is a rolling bearing with cylindrical or roller-shaped rolling elements 42" that have a smaller diameter than the spherical rolling elements 34", 35". This is not mandatory, however. The diameter could instead be chosen as different, and/or instead of rollers 42", ball-, needle-, cone- or barrel-shaped rolling elements, or a sliding bearing or other type of bearing, could be used for the radial bearing 41". Moreover, at least one such radial bearing 41" can be disposed in the radially inner gap 9" or in the radially outer gap 10" or in both. For the axial guidance of roller-shaped rolling elements 42", at least one raceway 43", 44" can be configured as a groove-shaped depression in the particular connecting element 6"-8".

The raceways 32", 33", 43", 44" of a connecting element 6"-8" are preferably formed along with the particular bores 11"-13" by processing or shaping the same common base body.

Since the two noses 28" of the middle connecting element 8" are respectively embraced on three sides by the grooves 29" of the other two connecting elements 6"-8", assembly of the blade bearing 5" is possible only if the radially innermost and the radial outermost connecting elements 6", 7" are each divided in the region of the respective groove 29", along a horizontal surface 45", respectively into an upper ring 46" and a lower ring 47", which are simultaneously slid from both axial directions over the noses 28" of the middle connecting element 8" and only then are connected to each other, particularly screwed together.

Figure 5:
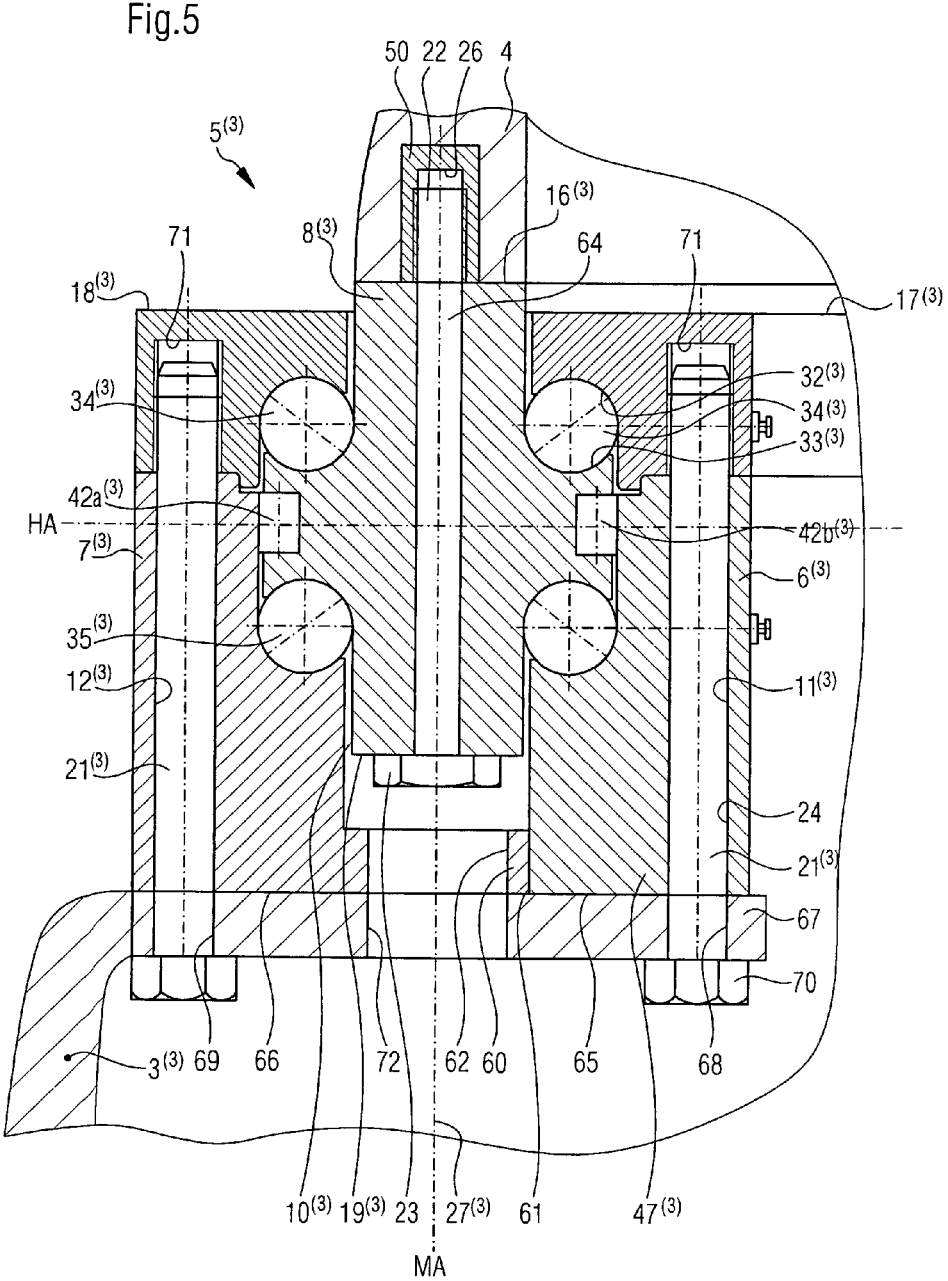
FIG. 5 is a representation corresponding to FIG. 2 of another embodiment of the invention.

In the wind power plant $1^{(3)}$ according to FIG. 5, the wind wheel $2^{(3)}$ differs from the previously described embodiment 1", 2" in only a few details; the basic structure is nearly identical.

A first difference lies in the fact that in embodiment $1^{(3)}$, $2^{(3)}$, instead of a single radial bearing 41, 42; 42", two radial bearings $42a^{(3)}$, $42b^{(3)}$ are provided, specifically one in the gap $9^{(3)}$ between the radially innermost connecting element $6^{(3)}$ and the middle connecting element $8^{(3)}$ and one in the gap $10^{(3)}$ between the middle connecting element $8^{(3)}$ and the radially outermost connecting element $7^{(3)}$. In this arrangement, the rolling elements of the radial bearings $42a^{(3)}$, $42b^{(3)}$ can each be received in a trough-shaped depression in a connecting element $6^{(3)}$, $7^{(3)}$, $8^{(3)}$, preferably in the middle connecting element $8^{(3)}$. The rolling elements of the radial bearings $42a^{(3)}$, $42b^{(3)}$ are preferably disposed at the same height.

Whereas the radially middle connecting element $8^{(3)}$ differs little from the previously described middle connecting element 8", there are several deviations with regard to the other two connecting elements $6^{(3)}$, $7^{(3)}$ In contrast to connecting elements 6", 7", connecting elements $6^{(3)}$, $7^{(3)}$ are in direct contact. This contact region is located on an end side of the middle connecting element $8^{(3)}$, preferably in axial prolongation of a gap $9^{(3)}$, $10^{(3)}$, particularly the radially inner gap $9^{(3)}$. Here, a cylinder-segment-shaped outer surface of the radially innermost connecting element $6^{(3)}$ rests against a hollow-cylindrical surface inside the radially outermost connecting element $7^{(3)}$. This areal contact causes a centering of the two connecting elements $6^{(3)}$, $7^{(3)}$.

To form a direct contact, in contrast to the embodiment according to FIG. 3, here the two outer connecting elements $6^{(3)}$, $7^{(3)}$ are configured as much taller in the axial direction than the middle connecting element $8^{(3)}$. In the region of the protrusion in the axial direction, at least one of the two connecting elements $6^{(3)}$, $7^{(3)}$ has a circumferential flange 60. This flange 60 extends all the way to the respectively other connecting element $6^{(3)}$, $7^{(3)}$ and there forms a contact along a contact surface 61.

The flange 60 is provided with through-holes 62 whose diameter is larger than the maximum diameter of the nut 23 or of the head 63 of a screw 64 that is screwed through the middle connecting element $8^{(3)}$ and on into a rotor blade 4. The number of through-holes 62 is the same as the number of screw bushings 50 in the rotor blade 4, and their distribution over the circumference is identical to the distribution of the screw bushings 50 over the circumference of the end side of the rotor blade. Due to the larger diameter of the through-holes compared to the nuts 23 or screw heads 63, it is possible to fit a socket wrench through the openings or through-holes 62 and onto a screw element, i.e. a nut 23 or a screw head 63, and tighten it in this way.

The ends of the two outer connecting elements $6^{(3)}$, $7^{(3)}$ that serve as respective connecting surfaces 65, 66, these being the ends facing toward the hub $3^{(3)}$, preferably lie in a common plane that is intersected perpendicularly by the axis of rotation of the bearing. In this case, therefore, the region 67 of the hub $3^{(3)}$ that is to be screwed together with them can also be configured as flat and continuous, i.e. as one piece, and can be screwed to the two connecting surfaces 65, 66. To accomplish this, the screws $21^{(3)}$ engage through coronally distributed bores 68, 69 in the region 67 of the hub $3^{(3)}$. Thus, they are not screwed in from the bearing end side that faces the rotor blade 4, and the bottom sides of the screw heads 70 therefore rest against the inner side of the hub region 67. The screw connections $21^{(3)}$, 70 are optimized in that the bores $11^{(3)}$, $12^{(3)}$ do not pass all the way through the two outer connecting elements $6^{(3)}$, $7^{(3)}$, but instead are configured as blind bores. Under these circumstances, only the region of the bores $11^{(3)}$, $12^{(3)}$ where the bottom 71 of a blind hole $11^{(3)}$, $12^{(3)}$ is located is provided with an internal thread, so the screws $21^{(3)}$, 70 anchor there only. The screw-attached hub region 67 has bores 72 that are aligned with the through-holes 62 of the flange 60 and through which the nuts 23 or screw heads 63 can be accessed.

One advantage of this arrangement is that all the screw connections 20, 23 are accessible from the inside, by way of the hub 3$^{(3)}$.

Figure 6:
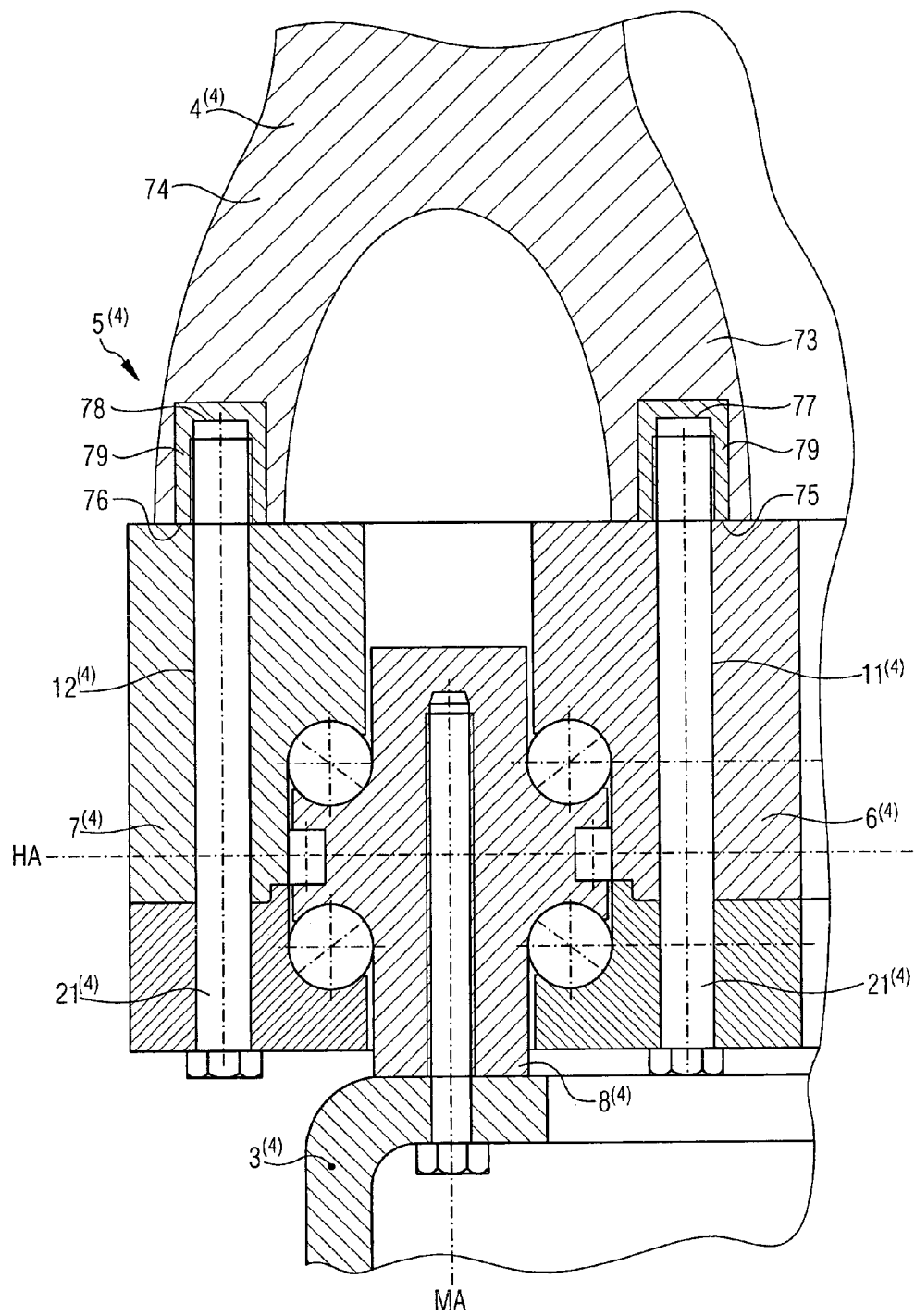
FIG. 6 is a representation corresponding to FIG. 2 of a further modified embodiment of the invention.

The case is similar for the embodiment of a wind power plant 1$^{(4)}$ according to FIG. 6, where the blade bearing 5$^{(4)}$ does not differ from the previously described embodiment 5$^{(3)}$; only the manner of installation in a wind power plant 1$^{(4)}$ is slightly different.

Specifically, here the hub 3$^{(4)}$ and the rotor blade 4$^{(4)}$ are switched in terms of how they are connected. That is, the hub 3$^{(4)}$ is connected to the middle connecting element 8$^{(4)}$, whereas the rotor blade 4$^{(4)}$ is connected to the two outer connecting elements 6$^{(4)}$, 7$^{(4)}$. This is made possible by the fact that the rotor blade 4$^{(4)}$ is split, in the region of its back end, into two mutually concentric aprons 73, 74 that are spaced apart from each other in the radial direction, each of which has a flat connecting surface 75, 76 provided with respective coronally distributed blind bores 77, 78, each with at least one inserted threaded bushing 79. In this case, the therewith-aligned bores 11$^{(4)}$, 12$^{(4)}$ in the two outer connecting elements 6$^{(4)}$, 7$^{(4)}$ are configured as threadless through-bores, through each of which a respective screw can be inserted to fasten the rotor blade 4$^{(4)}$.

The invention allows of various modifications. For example, the flange 60 could be or become connected along the contact surface 61 to the respectively other connecting element 6$^{(3)}$, 7$^{(3)}$ or 6$^{(4)}$, 7$^{(4)}$ in a punctiform or areal manner to further increase stability. In general, however, screwing both connecting elements 6, 7 jointly to a common machine part—the hub 3 or the rotor blade 4—should render such a measure superfluous.

List of Reference Numerals

| | |
|---|---|
| 1 | Wind power plant |
| 2 | Wind wheel |
| 3 | Hub |
| 4 | Rotor blade |
| 5 | Blade bearing |
| 6 | Connecting element |
| 7 | Connecting element |
| 8 | Connecting element |
| 9 | Gap |
| 10 | Gap |
| 11 | Bore |
| 12 | Bore |
| 13 | Bore |
| 14 | Connecting surface |
| 15 | Connecting surface |
| 16 | Connecting surface |
| 17 | End face |
| 18 | End face |
| 19 | End face |
| 20 | Head |
| 21 | Screw |
| 22 | Bolt |
| 23 | Nut |
| 24 | Bore |
| 25 | Bore |
| 26 | Bore |
| 27 | Longitudinal axis |
| 28 | Nose |
| 29 | Groove |
| 30 | Lateral surface |
| 31 | Lateral surface |
| 32 | Raceway |
| 33 | Raceway |
| 34 | Rolling element |
| 35 | Rolling element |
| 36 | Section |
| 37 | Section |
| 38 | Section |
| 39 | Section |

List of Reference Numerals (continued)

| | |
|---|---|
| 40 | End side |
| 41 | Bearing |
| 42 | Rolling element |
| 43 | Raceway |
| 44 | Raceway |
| 45 | Surface |
| 46 | Upper ring |
| 47 | Lower ring |
| 48 | Internal thread |
| 49 | Internal thread |
| 50 | Bushing |
| 51 | Rotor blade jacket |
| 52 | End |
| 53 | Mounting surface |
| 54 | Mounting surface |
| 55 | Apron |
| 56 | Apron |
| 57 | Web |
| 58 | Access bore |
| 59 | Jacket |
| 60 | Flange |
| 61 | Contact surface |
| 62 | Through-hole |
| 63 | Screw head |
| 64 | Screw |
| 65 | Connecting surface |
| 66 | Connecting surface |
| 67 | Region |
| 68 | Bore |
| 69 | Bore |
| 70 | Screw head |
| 71 | Bottom |
| 72 | Bore |
| 73 | Apron |
| 74 | Apron |
| 75 | Connecting surface |
| 76 | Connecting surface |
| 77 | Blind bore |
| 78 | Blind bore |
| 79 | Threaded bushing |

The invention claimed is:

1. A rolling bearing assembly for a large rolling bearing, comprising at least three relatively rotatable connecting elements arranged concentrically with one another, and at least regionally inside one another, each having a flat connecting surface for connection to one of two different plant components rotatable to each other, wherein each two of the three relatively rotatable connecting elements are separated from each other by a gap and at least partially overlap each other in their radial extent, wherein provided in the region of each of the two gaps in radially overlapping regions of the annular connecting elements are at least two rows of spherical rolling elements, each of which rolls along two raceways that overlap each other at least regionally in the radial direction, wherein the center points of the spherical rolling elements of the four rows of balls move along four circular paths around the axis of rotation of the rolling bearing, and the points at which these paths are intersected by a cross sectional plane of the rolling bearing radially to its axis of rotation lie at the corners of a quadrangle, wherein the radially innermost connecting element and the radial outermost connecting element are connected to one plant component, and the radially middle connecting element is connected to the other plant component,
   a) comprising at least one additional row of rolling elements whose raceways do not overlap in the radial direction,
   b1) wherein the rolling elements whose raceways do not overlap in the radial direction roll along a free end side of a nose of the middle connecting element and are arranged between two rows of rolling elements whose raceways overlap each other in the radial direction and are point-symmetric to the raceway cross sections of a diagonally offset row of balls, or b2) wherein the connecting line between two diametrically opposite corners of the quadrangle formed by the circular paths of the center points of the rolling elements rolling along raceways overlapping each other in the radial direction intersects a connection line between the centers of the fitted regions of the two raceway cross sections associated with each two rows of balls approximately perpendicularly.

2. The rolling bearing arrangement as in claim 1, wherein the radial overlap of said two connecting elements is equal to, or greater than, the radius of a rolling element rolling in the radially overlapping region.

3. The rolling bearing arrangement as in claim 2, wherein the overlapping raceways overlap along a radial extent that is equal to, or greater than, the radius of the rolling element.

4. The rolling bearing arrangement as in claim 1, wherein the middle connecting element is divided in the axial direction into at least three sections comprising a first section, disposed adjacent its connecting surface; a second section, adjacent its opposite end side; and, therebetween, a third section that projects, or recedes, to an equal extent in a radial direction relative to the first two.

5. The rolling bearing arrangement as in claim 1, wherein the rolling elements of different rows at mutually corresponding radial positions are of equal size.

6. The rolling bearing arrangement as in claim 5, wherein the spherical rolling elements of the four rows are the same size.

7. The rolling bearing arrangement as in claim 6, wherein the four rows of rolling elements are the same distance from the center radius of a coronal arrangement of fastening elements of the middle connecting element.

8. The rolling bearing arrangement as in claim 6, wherein the raceway cross sections of a rolling-element row are mirror-symmetrical, with respect to a main plane of the rolling bearing, to the raceway cross sections of an axially offset row of rolling elements.

9. The rolling bearing arrangement as in claim 8, wherein the raceway cross sections of a rolling-element row are mirror-symmetrical, with respect to a center axis located in a cross-sectional plane and extending parallel to the axis of rotation of the bearing, to the raceway cross sections of a radially offset row of balls.

10. The rolling bearing arrangement as in claim 9, wherein the raceway cross sections of a rolling-element row of a point in the cross-sectional plane are point-symmetric to the raceway cross sections of a axially and radially offset row of balls, and are point-symmetric under point reflection at an intersection point of a main plane with the parallel center axis.

11. The rolling bearing arrangement as in claim 10, wherein a contact angle of the spherical rolling elements rolling between a respective two raceways that overlap each other, at least regionally in the radial direction is 45°, or more.

12. The rolling bearing arrangement as in claim 11, wherein at least one additional bearing location, whose contact angle is less than 45°, said additional bearing location comprising a rolling bearing.

13. The rolling bearing arrangement as in claim 12, wherein the spherical rolling elements comprise a contact angle of less than 45° roll between two raceways disposed radially adjacent the radially overlapping region of the connecting elements.

14. The rolling bearing arrangement as in claim 13, wherein the rolling elements with a contact angle of less than 45° are configured as roller, or cylinder-shaped, with a longitudinal axis extending parallel to the axis of rotation of the bearing.

15. The rolling bearing arrangement as in claim 1, wherein provided in the middle connecting element, and/or in one or both of the respectively other connecting elements, are coronally distributed fastening bores comprising through-bores whose longitudinal axes are parallel to the axis of rotation of the bearing, with no internal thread.

16. The rolling bearing arrangement as in claim 1, wherein the middle connecting element, or one or both of the other connecting elements, is/are divided along a main plane of the bearing.

17. The rolling bearing arrangement as in claim 16, wherein an end side of each of two outer connecting elements embraces the middle connecting element on an end side thereof, so as to create a form lock that includes the rolling elements.

18. The rolling bearing arrangement as in claim 17, wherein the two outer connecting elements are contiguous with each other.

19. A wind power plant having a wind wheel that rotates on an axis that is generally parallel to the direction of the wind, wherein one or a plurality of elongated rotor blades are arranged projecting generally radially from a hub of a rotor, and such that each rotor blade can be rotated about its longitudinal axis by means of a respective blade bearing, wherein at least one of the blade bearings comprises at least three relatively rotatable connecting elements arranged concentrically with one another, and at least regionally inside one another, each having a flat connecting surface for connection to relatively rotatable parts of the wind power plant, wherein each two of the three relatively rotatable connecting elements are separated from each other by a gap and wholly or partially overlap each other in the radial direction, and wherein, provided in the region of each of the two gaps in the radially overlapping regions of the annular connecting elements, are at least two rows of spherical rolling elements, each of which rolls along a respective two raceways that overlap each other at least regionally in the radial direction, wherein the center points of the spherical rolling elements of the four rows of balls move along four circular paths around the axis of rotation of the rolling bearing, and the points at which these paths are intersected by a cross sectional plane of the rolling bearing radially to its axis of rotation lie at the corners of a quadrangle, wherein the radially middle connecting element is connected to the hub or the rotor blade, and the radially innermost connecting element and the radially outermost connecting element are connected to the other of the hub or the rotor blade, a) wherein the at least one of the blade bearings comprises at least one additional row of rolling elements whose raceways do not overlap in the radial direction, b1) wherein the rolling elements whose raceways do not overlap in the radial direction roll along a free end side of a nose of the middle connecting element and are arranged between two rows of rolling elements whose raceways overlap each other in the radial direction and are point-symmetric to the raceway cross sections of a diagonally offset row of balls, or b2) wherein the connecting line between two diametrically opposite corners of the quadrangle formed by the circular paths of the center points of the rolling elements rolling along raceways overlapping each other in the radial direction intersects a connection line between the centers of the fitted regions of the two raceway cross sections associated with each two rows of balls approximately perpendicularly.

20. The wind power plant as in claim 19, wherein screws or bolts passing through the middle connecting element are screwed into a back end of the rotor blade, or into the hub, or are connected thereto by means of a respective anchoring body embedded in the rotor blade, the anchoring body having an internal thread.

21. The wind power plant as in claim 20, wherein screws or bolts pass through the radially innermost and the radially outermost connecting elements and are screwed into the hub, or into the back end of the rotor blade, or are connected thereto.

22. The wind power plant as in claim 21, wherein provided on the hub or on the rotor blade is a connection region comprising two aprons arranged concentrically one inside the other, for connection to the radially innermost and the radially outermost connecting element of the blade bearing.

23. The wind power plant as in claim 22, and further comprising inspection bores, at least in a fork-shaped connecting region, through which fastening means of the middle connecting element are accessible.

24. A wind power plant having a wind wheel that rotates on an axis that is generally parallel to the direction of the wind, wherein one or a plurality of elongated rotor blades are arranged projecting generally radially from a hub of a rotor, and such that each rotor blade can be rotated about its longitudinal axis by means of a respective blade bearing, wherein one or more of the blade bearings are configured as a rolling bearing with a diameter of 0.5 m or more, and comprise at least two relatively rotatable connecting elements arranged concentrically with one another, and at least regionally inside one another, for connection to relatively rotatable parts of the wind power plant, wherein the two relatively rotatable connecting elements are separated from each other by a gap and wholly or partially overlap each other in the radial direction, and wherein, provided in the region of a gap in the radially overlapping regions of the annular connecting elements, are at least two rows of rolling elements, each of which rolls along a respective two raceways that overlap each other at least regionally in the radial direction, wherein at least one blade bearing comprises at least three relatively rotatable annular connecting elements, each of which is provided with a flat connecting surface for connection to the hub or to the rotor blade, wherein the three annular connecting elements are disposed radially overlappingly inside one another and the radially middle connecting element is connected to the hub or the rotor blade, and the radially innermost connecting element and the radially outermost connecting element are connected to the other of the hub or the rotor blade, wherein screws or bolts passing through the middle connecting element and are screwed into a back end of the rotor blade, or into the hub, or are connected thereto by means of a respective anchoring body embedded in the rotor blade, the anchoring body having an internal thread;

wherein screws or bolts pass through the radially innermost and the radially outermost connecting elements and are screwed into the hub, or into the back end of the rotor blade, or are connected thereto;

wherein provided on the hub or on the rotor blade is a connection region comprising two aprons arranged concentrically one inside the other, for connection to the radially innermost and the radially outermost connecting element of the blade bearing;

further comprising inspection bores, at least in a fork-shaped connecting region, through which fastening means of the middle connecting element are accessible.

* * * * *